J. L. & G. W STEVENS,

Assignors, by mesne assignments, to C. E. COBURN & H. F. BILLINGS.

Case for Transporting Eggs.

No. 8,091. Reissued Feb. 19, 1878.

Witnesses

G. E. Wolfman

C. H. Sherburne,

Inventor

John L. Stevens.

Geo. W. Stevens.

By Bridley & Sherburne,

Attorneys,

UNITED STATES PATENT OFFICE.

JOHN L. STEVENS AND GEORGE W. STEVENS, OF SAN FRANCISCO, CALIFORNIA, ASSIGNORS, BY MESNE ASSIGNMENTS, TO CHARLES E. COBURN AND HARRIET F. BILLINGS, OF CHICAGO, ILLINOIS.

IMPROVEMENT IN CASES FOR TRANSPORTING EGGS.

Specification forming part of Letters Patent No. 62,378, dated February 26, 1867; Reissue No. 8,091, dated February 19, 1878; application filed February 6, 1878.

*To all whom it may concern:*

Be it known that we, JOHN L. STEVENS and GEORGE W. STEVENS, of the city and county of San Francisco, and State of California, have invented certain new and useful Improvements in Cases for Transporting Eggs; and we do hereby declare the following to be a full, clear, and exact description thereof, which will enable others skilled in the art to which our invention appertains to make and use the same, reference being had to the accompanying drawing, forming part of this specification, in which—

Figure 1:
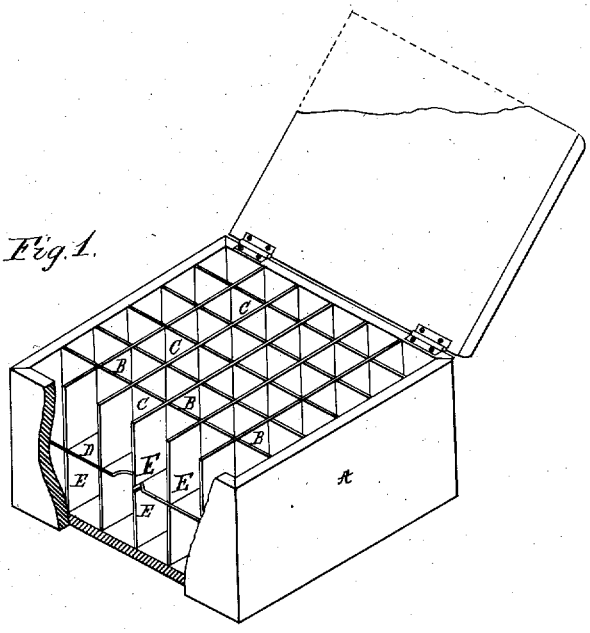
Figure 2:
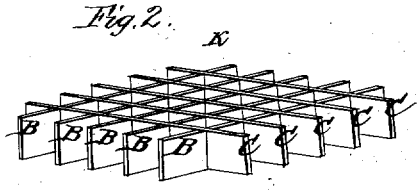

Figure 1 represents an isometrical projection of an egg-case embodying our improvements, with the front of the case broken away to show the construction; and Fig. 2 is a perspective view of one of the trays removed from the case and partly folded for reshipment.

The object of our invention is to provide a case for transporting eggs, by the use of which we are enabled to pack more eggs in a given space, while the loss by breakage is reduced so much as to pay for the increased cost of the case by the amount saved in one shipment.

To effect this we construct a box or case in any convenient shape, and of any desired material and dimensions, and provide it with a series of removable trays containing a series of bottomless cells, pockets, or compartments, and a removable diaphragm or dividing-board placed horizontally between the trays, or series of bottomless compartments, from the bottom to the top of the case, and so as to form one or more series of closed compartments of sufficient size to hold one egg each, irrespective of the walls of the case.

In the drawing, A represents a box or case, constructed in any convenient shape and of any desired material and dimensions. Strips of tin, zinc, sheet-iron, or any suitable material, B B, are placed across the box in one direction, and similar strips, C C, are placed across at right angles, as here shown, or in any convenient way, so that a space will be inclosed of sufficient size to hold an egg. The strips B B are cut at their points of intersection to a depth of one-half their width, and the intersecting strips C C in the same manner, so as to fit together.

The first tray, or series of bottomless compartments E E, is placed in the box, and eggs are put in, ends down, till the compartments are full, and a diaphragm, D, is then placed on the top of the tray.

Another tray or series of bottomless compartments, made up of the dividing-strips B C, is then placed on the top of the dividing-board D, and filled in the same manner, and so on to any desired depth, depending on the height of the box.

Among the advantages gained are, more eggs can be packed in the same space than by any other mode of packing, and they can be packed very expeditiously.

The breakage, which, on this coast, at least, is from ten to forty per cent., is reduced to almost nothing, while any eggs that may be broken are confined to their own compartments, and cannot spoil other eggs by heating, or give them a dirty appearance.

Enough will be saved by using these cases once to pay the extra cost, and the material used for twenty boxes can, by taking them apart, be packed in one box and sent back to be used again, and for any number of times.

The strips B and C may be removed and folded, as shown at K.

Having thus described our invention, what we claim, and desire to secure by Letters Patent, is—

1. In a case for transporting eggs, the combination of two or more removable trays, each containing a series of bottomless cells or compartments, with one or more removable diaphragms or dividing-boards, substantially as and for the purpose specified.

2. The combination of two or more trays, each containing a series of bottomless cells or compartments, with one or more removable diaphragms or dividing-boards, substantially as and for the purpose specified.

JOHN L. STEVENS.
GEO. W. STEVENS.

Witnesses:
JAMES H. HUNTER,
K. NEWELL.